United States Patent [19]
Daeuble et al.

[11] 3,830,627
[45] Aug. 20, 1974

[54] DYE BATH WITH BLOCK COPOLYMERIC PROPYLENE AND ETHYLENE OXIDES AS FOAM SUPPRESSANTS

[75] Inventors: Manfred Daeuble, Frankenthal; Knut Oppenlaender; Rolf Fikentscher, both of Ludwigshafen, all of Germany

[73] Assignee: Badische Anilin- & Soda-Fabrik Aktiengesellschaft, Ludwigshafen/Rhine, Germany

[22] Filed: Sept. 8, 1971

[21] Appl. No.: 178,820

[30] Foreign Application Priority Data
Sept. 9, 1970 Germany............................ 2044647

[52] U.S. Cl.................................. 8/92, 8/93, 8/173, 8/169
[51] Int. Cl.................................................. D06p 1/68

[58] Field of Search............................. 8/93, 173, 92

[56] References Cited
UNITED STATES PATENTS

| | | | |
|---|---|---|---|
| 2,090,511 | 8/1937 | Crossley | 8/79 |
| 2,486,562 | 11/1949 | Iamarino | 260/336 |
| 3,003,843 | 10/1961 | Amick | 8/93 |

FOREIGN PATENTS OR APPLICATIONS

| | | | |
|---|---|---|---|
| 1,543,714 | 11/1967 | France | 8/93 |

Primary Examiner—Donald Levy
Attorney, Agent, or Firm—Johnston, Keil, Thompson & Shurtleff

[57] ABSTRACT

Low-froth water-soluble dyeing auxiliaries based on surfactants and esterification products of fatty acids and oleic acid.

8 Claims, No Drawings

DYE BATH WITH BLOCK COPOLYMERIC PROPYLENE AND ETHYLENE OXIDES AS FOAM SUPPRESSANTS

This invention relates to water-soluble dyeing auxiliaries that dissolve clearly in the dye liquor with little or no frothing.

The auxiliaries may be employed, depending on their specific compositions, for dyeing natural and synthetic fibers of all types, provided the pH remains in the range between 2.5 and 8.0 during dyeing.

In most instances, dyeing auxiliaries hitherto used in the textile industry have been surfactants (detergents) which exhibit high foaming or frothing power in aqueous solution with the usual concentrations employed. In many dyeing processes dense foam may be produced and lead to serious disturbances. For this reason there was great interest in reducing foaming or preventing it completely.

The simplest method would be to use non-frothing products as dyeing auxiliaries. Only in a few cases has it been possible to date to find such products, and these were often clearly inferior in various important properties to the foam-producing products already known. It was attempted to prevent foam formation and/or destroy a foam already formed by the addition of defoaming agents. Defoaming agents containing silicone oils are particularly effective (Walter Noll, Chemie und Technologie Silicone, Verlag Chemie, Weinheim, Bergstr., 1960, p. 401).

The formation of a surface film of silicone oil insoluble in the liquor is necessary for the defoaming effect. According to D. G. Dervichian, Zeitschrift fuer Elektrochemie, 59, 240 (1955), the theory of defoaming requires that the defoaming agent be insoluble in the medium to be defoamed. However, it is not easy to emulsify the silicone oils in such a way that they form uniform surface films. These emulsions often break, when the silicone oils are precipitated and settle on the textiles being treated. They produce stains that are practically irremovable.

According to the authority just quoted one also employs other products insoluble in water as defoaming agents, for instance mineral oils or tributylphosphate. The defoaming effect of these products is distinctly less than that of the silicone oils; they too form emulsions of inadequate stability and may cause stains by the emulsions being broken. Similar considerations apply to fatty acids, their aluminum and alkaline earth metal salts and to mixtures of aliphatic alcohols, ketones and esters. Some of these compounds are characterized by an unpleasant odor of varying degree that can be a great nuisance for the operating personnel.

Fatty acids and their salts insoluble in water, together with silicones, often have an undesirable hydrophobic effect. From French Pat. No. 1,543,714 it is known that esters from one mole of an addition product of ethylene oxide and where appropriate subsequently propylene oxide with a polypropylene glycol ether having a mean molecular weight of from 1,000 to 5,000 and containing between 15 and 60 % of etherified ethylene glycol groups relative to the total weight of the addition product, and 2 moles of a saturated fatty acid with 12 to 18 carbon atoms can also be used as defoaming agents. However, these products are soluble in water only with great difficulty and form turbid emulsions or dispersions from which they are often precipitated, settling on the textiles being treated and causing stains. When the dye liquor flows through the material being dyed, these compounds are filtered off, become ineffective and form troublesome deposits. If these products are used for defoaming padding liquors, specks and stains are formed on the material because of the precipitated insoluble defoaming agents.

It is an object of the invention to provide a water-soluble, non-foaming dyeing auxiliary which does not exhibit the aforementioned disadvantages and when dyeing from a long bath improves evenness of the coloration, prevents difficulty soluble dyes from being precipitated and improves fastness to crocking.

Another object of the invention is to improve the wetting effect and ensure uniform distribution of the padded dye of the fiber.

These and other objects and advantages of the invention are achieved by low-froth, water-soluble dyeing auxiliaries based on non-ionic and/or anionic or cationic sufactants containing:

a. 10 to 50% by weight, with reference to the dyeing auxiliary, of a non-ionic, an anionic or cationic surfactant or of a mixture of surfactants;

b. 10 to 50% by weight, with reference to the dyeing auxiliary, of an esterification product from 2 molar equivalents of a mixture of fatty acids containing not less than 30% oleic acid, and from one molar equivalent of a block copolymer of ethylene oxide and 1,2-propylene oxide, having a molecular weight of about 1,500 to 7,000, the sum of $a$ and $b$ being less than or equal to 80% by weight; and c. 20 to 80% by weight, with reference to the dyeing auxiliary, of water, an organic solvent or a mixture of the two.

The fact that the dyeing auxiliaries in accordance with the invention do not produce foaming is surprising, since according to D. G. Dervichian (loc.cit) the theory of defoaming requires that the defoaming agent be insoluble in the medium to be defoamed. It was particularly surprising that by partially or entirely replacing the saturated fatty acids by oleic acid clear dyebaths and padding liquors are obtained, whereas the esters of the saturated fatty acids alone, even in the presence of surfactants, are absolutely insoluble in water.

The saturated fatty acid esters are insoluble in water unless further additives are employed. However, dissolving these compounds in dyebaths in the presence of surfactants is inconvenient and time-consuming; rather large particles may remain undissolved and cause stains on the material being dyed.

The dyeing auxiliaries in accordance with the invention can now be obtained as clear, homogeneous mixtures with very good storage life at room temperature simply by stirring the stated mixtures of oleic acid and fatty acid esters with surfactants and water.

Instead of water, the dyeing auxiliaries may contain water-soluble organic solvents such as butyl diglycol, butyl triglycol, isopropanol, dipropylene glycol, butyrolactone, N-methylpyrrolidone or dimethyl formamide. In such cases the stability of the auxiliaries during storage can be still further improved in many instances. A mixture of water and solvent may also be used.

Depending on the additives used for these water-soluble organic solvents, the new dyeing auxiliaries are slightly to highly viscous and also — surprisingly — miscible with water in all proportions, when they give at once a clear, homogeneous solution. They facilitate the manufacture of stable, non-foaming dyebaths and padding liquors in a really ideal fashion, since working with ready-made mixtures of dyeing auxiliaries is more simple in any case than when each of the components has to be weighed out separately and added to the dyebath or padding liquor. Moreover, blending of the individual components to produce stable mixtures can be better supervised and controlled than can the preparation of dyebaths and padding liquors when each component is added separately.

Surfactants which may be employed as component $a$ for the purposes of the invention are, for instance: non-ionogenic compounds and addition products of ethylene oxide, propylene oxide, butylene oxide or mixtures of these epoxides with saturated fatty acids, fatty alcohols, fatty amines, fatty amides, alkyl phenols, glycols and other compounds whose active hydrogen atoms permit the addition of low molecular weight epoxides.

Anionic compounds produced by sulfation or sulfonation are, for example, semi-esters of sulfuric acid of the non-iogenic products mentioned in the aforegoing and are produced by oxyethylation or oxypropylation and/or by simultaneous or alternate addition of ethylene oxide and propylene oxide in a number of steps, semi-esters of sulfuric acid of the fatty alcohols, sulfated castor oil and its derivatives, sulfated and sulfonated oleic acid and its derivatives, alkylbenzene sulfonic acids and alkyl sulfonic acids.

Cationic compounds are, for example, salts of the alkyl pyridinium ion, of the methyl-alkyl piperidinium ion or of the tetraalkyl ammonium ion, in which the alkyl residue contains not less than 10 carbon atoms in the main chain.

The compounds cited are known washing, wetting and levelling auxiliaries which, when used alone, cause very powerful foaming, i.e. have the said disadvantages.

Component $b$ of the dyeing auxiliaries in accordance with the invention represents the defoaming component. These are esterification products of fatty acid mixtures containing oleic acid with 2 terminal hydroxyl groups carried by block copolymers in which the proportion of polymerized ethylene oxide units is between 10 and 80% by weight, preferably 20 and 60% by weight, while the proportion of polymerized propylene oxide units is between 20 and 90% by weight, preferably 40 and 80%.

Mixtures of the esterified fatty acids contained in accordance with the invention are derived from the naturally occurring mixtures of fatty acids by using oleic acid.

These include: soya bean fatty acid, peanut oil fatty acid, fatty acids derived from bovine, pig or mutton tallow, or palm oil fatty acid,, all of which contain at least 30% oleic acid. In addition, such mixtures can be produced by mixing, in accordance with the definition, oleic acid with $C_{10}$ to $C_{30}$ fatty acids which are saturated.

Of the various fatty acids in accordance with the invention the following may be named above all as saturated fatty acid omponent: capric acid, myristic acid, palmitic acid, stearic acid, arachidic acid, behenic acid and cerotic acid.

The block copolymers subsequently esterified with the mixture of saturated fatty acids and oleic acid in accordance with the definition may be manufactured by the addition of ethylene oxide to polypropylene glycol or the addition of propylene oxide to polyethylene glycol. These procedures may also be carried out alternately in several steps. For instance, ethylene oxide and propylene oxide may be alternately added to polypropylene glycol and/or propylene oxide and ethylene alternately added to polyethylene glycol.

The dyeing auxiliaries in accordance with the invention are obtained by mixing the surfactants in accordance with the definition with the said ester mixtures, water and/or organic solvents which are miscible with water. Depending on the detergent employed, the dyeing auxiliaries have a levelling, wetting or washing effect, and the liquors either foam only very slightly or not at all. The effect of the detergents remains unaffected; indeed, in some cases an improved effect was observed.

The dyeing auxiliaries in accordance with the invention have the following composition:

10 to 50% by weight, with reference to the dyeing auxiliary, preferably 15 to 30% by weight, of one or more of the aforementioned detergents;

10 to 50% by weight, with reference to the dyeing auxiliary, of the esterification product of 2 molar equivalents of a mixture of fatty acids containing at least 30%, preferably 40 to 80%, of oleic acid, and one molar equivalent of a block copolymer, carrying two terminal hydroxyl groups, of ethylene oxide and 1,2-propylene oxide, the product having a molecular weight of 1,500 to 7,000, the weight of this mixture accounting for 20 to 80% of the total weight of the dyeing auxiliary, and 20 to 80%, preferably 55 to 70% by weight, with reference to the dyeing auxiliary, of water and/or an organic solvent. The dyeing auxiliaries in accordance with the invention can be employed in all dyebaths and padding liquors in which the pH is between 2 and 8. They cannot be used in caustic alkali liquors because the defoaming component becomes saponified and hence inactivated.

The following formulae for the use of the dyeing auxiliaries in accordance with the invention have proved to be particularly effective for the various types of fiber:

oxyethylated fatty alcohols, saturated fatty acids, fatty amines or fatty acid amides as well as their sulfation products can be emploxed for dyeing wool and synthetic polyamide fibers with 1:2 and 1:1 metal complex dyes. Mixtures of these compounds, which sometime better the effects produced by the individual compounents, are also suitable for the manufacture of low-foam mixtures of dyeing auxiliaries.

With these dyeing auxiliaries, even acid dyes can be used to dye wool and polyamide fiber, above all types which do not level so well and generally exhibit good fastness to wetting. Furthermore, products with a wetting action can be added, for instance low-oxyethylated fatty and oxyalcohols as well as alkyl phenols. Of particular advantage are compounds to which propylene oxide and ethylene oxide have been alternately added step by step.

For dyeing synthetic polyamide fibers with acid dyes, the surfactants chiefly employed are anionic products $a$ which become attached to the polyamide fiber and partially block ist. This retards the attachment of anionic acid dyes and differences in the dye affinity of individual fibers are balanced.

Surfactants such as oxyethylation products of saturated fatty alcohols, fatty acids, castor oil, alkyl phenols and mixtures of the same are employed for dyeing synthetic polyamide fiber and polyester fiber, above all polyester fiber based on glycol terephthalate, with disperse dyes. When using the dyes stated, in addition to the dyeing auxiliaries other agents are added which improve the stability of the dye dispersion, for instance reaction products of formaldehyde and naphthalenesulfonic acid. For dyeing of polyester fiber, organic solvents acting as carrier may also be added, for instance: halogenated benzenes; esters of salicylic acid or homosalicylic acid with methanol, ethanol or propanol; products obtained by adding one mole of ethylene oxide to a chlorophenol such as p-chlorophenol or a mixture of o- and p-chlorophenol; diphenyl or o-hydroxydiphenyl.

In some instances, chiefly when carriers are necessary for dyeing polyester fibers, it is not necessary to add water if these carriers are liquids at room temperature and may therefore serve as organic solvents. In this case, one immediately adds to the dyeing auxiliary 20 to 80%, preferably 55 to 70% by weight, with reference to the dyeing auxiliary, of these solvents. Examples of carriers include halogen derivatives of benzene, of toluol, naphthalene or of the methyl naphthalenes, the monoglycol ethers of phenol, of the cresols, sylenols, naphthols or chlorine derivatives of these compounds as well as esters of salicylic acid with methanol, ethanol, propanols or butanols. In addition to these mixtures, such detergents as will keep the defoaming agents in solution also have to be added. For instance, oxyethylated fatty acids, fatty alcohols or alkyl phenols are preferred for this purpose.

For dyeing anionic modified polyacrylonitrile fiber with cationic dyes, surfactant quaternary amines are used as surface active agents $a$, for example alkyl pyridinium salts in which the alkyl group has between 10 and 18 carbon atoms, N-alkyl-N-methyl piperidinium salts or morpholinium salts in which the alkyl groups also contains between 10 and 18 carbon atoms, and N-benzyl pyridinium salts. These compounds have an affinity for anionic modified polyacrylonitrile fiber and hence retard attachment of the cationic dyes and/or promote levelling.

In general, anionic compounds may be used as surfactants $a$ that act as wetting agents, e.g. salts of the sulfosuccinic acid dialkyl esters, salts of sulfated esters of amides of ricinoleic acid or oleic acid, and salts of alkylbenzenesulfonic acids or alkylnaphtalenesulfonic acids.

Oxyethylation products of castor oil, of the fatty alcohols, oxoalcohols, of the alkyl phenols, of the fatty acids or the fatty amides may equally be added. Mixtures of anionic and non-iogenic products are especially advantageous. For dyeing polyester fiber with dispersed dyes, which in general is carried out at a high temperature with short reaction times (thermosol process), the addition of derivatives of polyacrylic acid is also of advantage, since they suppress migration of the pigments already attached.

The parts stated in the following examples are parts by weight.

EXAMPLE 1

Mix 15 parts of the esterification product of 2 moles of tallow acid with the addition product of 20 moles of ethylene oxide and a polypropylene oxide having a molar weight of 2,600, with 15 parts of the addition product formed by 30 moles of ethylene oxide with stearyl alcohol, with 70 parts of water. One obtains a pale yellow, clear slightly viscous liquid which is stable in storage for an unlimited time and is miscible with water in all proportions.

If one dyes 100 parts of wool for 90 minutes at boiling temperature in 4,000 parts of a dye liquor containing 3 parts of the aforementioned mixture, 1 part of dye C.I. No. 18745 and 6 parts of concentrated sulfuric acid, one obtains an orange coloration of excellent evenness which is resistant to cracking. During dyeing, the dye liquor exhibits practically no foaming.

If one uses, for dyeing 100 parts of wool, 4,000 parts of dye liquor containing 3 parts of the aforementioned mixture, 0.5 part of Dyestuff C.I. No. 15675 and 2 parts of ammonium sulfate, and dyes for 60 minutes at boiling temperature, one obtains a blue-tinted red coloration of excellent evenness. During dyeing, there is no foaming of the dye liquor.

EXAMPLE 2

Mix with 62 parts of water 18 parts of the esterification product of 2 moles of tallow acid with the addition product of 20 moles of ethylene oxide and a polypropylene glycol having a molecular weight of 1,350, and 20 parts of the monoethanolamine salt of the sulfuric acid semi-ester of an addition product of 80 moles of ethylene oxide and stearyl alcohol. One obtains a slightly viscous liquid miscible with water in all proportions.

If one dyes 100 parts of wool cloth in a winch vat with 3,000 parts of water containing 1 part of Acid Blue 219, 3 parts of the aforementioned dyeing auxiliary mixture and 2 parts of ammonium sulfate and boils the dye liquor for 60 minutes, one obtained a level reddish blue coloration resistant to cracking. No foam is developed in the dye liquor.

One also obtains foam-free, clear, water-soluble dyeing auxiliaries stable on starage if, instead of the 18 parts of the esterification product (mentioned in Example 2) of 2 moles of tallow acid with the addition produc of 20 moles of ethylene oxide and a polypropylene glycol having a molecular weight of 1,350, one uses products produced by esterification of 2 moles of tallow acids with the following block copolymers:

| Molecular weight of the polypropylene oxide | Proportion (molar) ethylene oxide |
|---|---|
| 1,820 | 20 |
| 1,600 | 36 |
| 2,400 | 36 |
| 2,250 | 50 |
| 2,700 | 40 |
| 3,356 | 33 |
| 3,200 | 72 |
| 4,140 | 39 |

The dyeing auxiliaries produced by these esterification products give, in an analogous manner to that described in Example 2, level colorations on wool, and the dye liquor exhibits practically no foaming.

EXAMPLE 3

Mix with 64 parts of water 18 parts of the esterification product of 1 mole or stearic acid and 1 mole of oleic acid with the addition product of 30 moles of ethylene oxide and a polypropylene glycol having a molecular weight of 1,800 and 18 parts of the monoethanolamine salt of the sulfuric acid semi-ester of an addition product of 80 moles of ethylene oxide and stearyl alcohol; one obtains a viscous liquid stable in storage.

If woollen cloth is dyed in the same manner as described in Example 2, one also obtains a level reddish blue coloration resistant to cracking, and there is no foaming of the dye liquor.

EXAMPLE 4

Mix with 67 parts of water 18 parts of the esterification product of 2 moles of oleic acid and the addition product of 30 moles of ethylene oxide and a polypropylene glycol having a molecular weight of 1,800 and 15 parts of the sodium salt of the sulfuric acid semi-ester of an addition product of 80 moles of ethylene oxide and stearyl alcohol. A viscous liquid stable when stored is obtained.

Dye 100 parts of polycaprolactam fiber in a winch vat with 4,000 parts of water, 8 parts of C.I. Acid Black 63 and 3 parts of the aforementioned mixture for 60 minutes at boiling temperature. One obtains a deep black, level coloration resistant to cracking.

EXAMPLE 5

Mix with 75 parts of a 40% (by weight) aqueous solution of the diethanolamine salt of dodecylbenzenesulfonic acid 25 parts of the esterification product of 2 moles of tallow acid with the addition product of 30 moles of ethylene oxide and a polypropylene glycol having a molecular weight of 2,000. A viscous liquid stable when stored is obtained.

Dye 100 parts of cloth made from nylon 6.6 fiber in a winch vat with 4,000 parts of water, 4 parts of monosodiumphosphate, 1 part C.I. Acid Red 151 and 2 parts of the aforementioned mixture for 60 minutes at boiling temperature. A streak-free and level red coloration resistant to cracking is obtained, while there is no foaming in the liquor.

EXAMPLE 6

Mix 25 parts of the esterification product named in Example 5 with 75 parts of a 40% solution of the triethanolamine salt of sulfated oleic acid butyl amide; a clear, homogeneous solution stable when stored and miscible with water in all proportion is obtained.

If 100 parts of tufted carpet consisting of textured nylon-6,6 fiber are dyed in a winch vat with 2,000 parts of water, 1 part of C.I. Acid Blue 72, 3 parts of the aforementioned dyeing auxiliary and 2 parts of monosodium phosphate for 60 minutes at boiling temperature, one obtains a greenish blue coloration of excellent evenness. The dye liquor shows no foaming.

EXAMPLE 7

Mix with 60 parts of water 20 parts of the esterification product named in Example 5 with 20 parts of the addition product of 40 moles of ethylene oxide and castor oil. One obtains a stable, viscous liquid miscible in water in all proportions. If one dyes 100 parts of knitwear of textured polyester fiber in a winch vat in which dyeing can be carried out under pressure at more than 100°C with 2,00 parts of water, 4 parts of the aforementioned mixture, 1 part of 60% acetic acid and 1 part of monobromo 1,5-diamino-4,8-dihydroxyanthraquinone for 60 minutes at 125°C one obtains a blue coloration of very good evenness. No foaming whatever takes plasce in the dye liquor.

EXAMPLE 8

With a dye liquor containing 15 parts of the dyeing auxiliary stated in Example 7, 8 parts of locust bean meal ether and 20 parts of C.I. Disperse Red 54 in 1,000 parts, impregnate combed tops of polyester fiber; pad, dry and thermosole on a perforated cage dryer for 1 minute at 200°C, after which re-clean at 80°C in a bath containing 4 parts of caustic soda solution and 2 parts of sodium hydrosulfite. One obtains a yellowish coloration of excellent evenness. No foaming occurs during padding.

A similar result is obtained when cloth of polyester fiber instead of combed tops is treated in the manner described.

EXAMPLE 9

Mix with 65 parts of water 20 parts of the esterification product of 2 moles of tallow acid and the addition product of 40 moles of propylene oxide and a polyethylene glycol derived from 28 moles of ethylene oxide with 15 parts of an addition produce of 10 moles of ethylene oxide and p-nonylphenol. One obtains a clear, slightly viscous liquid miscible with water in all proportions.

Dye 100 parts of knitwear of textured polyester fiber in a pressurized winch vat with 2,000 parts of water, 2 parts of the aforementioned dyeing auxiliary, 2 parts of C.I. Disperse Yellow 64 and 1 part of 60% acetic acid for 60 minutes at 125°C. One obtains a brilliant level greenish yellow coloration. Practically no foaming takes place in the liquor during dyeing.

EXAMPLE 10

Mix 30 parts of the esterification product named in Example 9 with 70 parts of a 30% solution of N-dodecyl-N-methylpiperidinium-methosulfate. A clear, slightly viscous liquid stable on storage is obtained.

If one dyes 100 parts of hanks of high-bulk polyacrylonitrile fiber in a hank dyeing machine containing 2,000 parts of water, 3 parts of the aforementioned dyeing auxiliary mixture, 0.5 part of C.I. Basic Blue 54 and 3 parts of glacial acetic acid for 90 minutes at boiling temperature, one obtains even colorations, there being no foaming of the liquor.

Even if 2 parts of an addition product of 30 moles of ethylene oxide and stearyl alcohol or 6 parts of the dyeing auxiliary mixture named in Example 1 are added to the liquor to remove troublesome substances, there is no appreciable foaming.

EXAMPLE 11

Mix with 25 parts of water 15 parts of the esterification product of tallow acid with the addition product of 28 moles of ethylene oxide and then of 40 moles of propylene oxide with ethylene glycol with 60 parts of a solution containing 50% by weight of the sodium salt of the sulfuric acid semi-ester of an addition product of 80 moles of ethylene oxide and stearyl alcohol.

One obtains a viscous mixture stable on storage that can be employed in the same manner as described in Example 2.

One obtains a level coloration resistant to cracking, and there is no foaming of the liquor during the dyeing process.

EXAMPLE 12

Mix 25 parts of the esterification product named in Example 1 with 25 parts of the addition product of 40 moles of ethylene oxide and castor oil and 50 parts of trichlorobenzene; a clear solution stable on storage is obtained.

If one dyes 100 parts of knitwear of textured polyester fiber in 2,000 parts of the dye liquor containing 2 parts of the aforementioned dyeing auxiliary, 0.5 part of C.I. Disperse Red 75 and 1 part of glacial acetic acid in a high-temperature winch vat for 90 minutes at 125°C, one obtains a bluish red coloration of excellent evenness. No foam is formed during the dyeing operation.

Similar results are obtained if homosalicylic acid ester or o-p-chlorophenyl-monoglycol ether is used instead of trichlorobenzene to produce the dyeing auxiliary.

We claim:

1. A textile dyeing liquor having a pH of between 2 and 8, containing a dyestuff and having added thereto a low-froth, water-soluble dyeing auxiliary composition dye consisting essentially of:
   a. 10 to 50% by weight, with reference to the composition, of a non-ionic, anionic or cationic surfactant or of a mixture of these surfactants;
   b. 10 to 50% by weight, with reference to the composition, of an esterification product obtained from 2 molar equivalents of a mixture of higher fatty acids containing not less than 30% oleic acid and from one molar equivalent of a block copolymer, carrying 2 terminal hydroxyl groups, of ethylene oxide and 1,2-propylene oxide, said block copolymer having a molecular weight of about 1,500 to 7,000, the sum of $a$ and $b$ being less than or equal to 80%; and
   c. 20 to 80% by weight, with reference to the composition, of water, water-soluble organic solvents or mixtures thereof.

2. A composition as claimed in claim 1 in which said block copolymer consists essentially of 10 to 80% ethylene oxide units and 90 to 20% propylene oxide units, with reference to the weight of the block copolymer.

3. A composition as claimed in claim 1 in which said block copolymer is an addition product of ethylene oxide and a polypropylene glycol.

4. A composition as claimed in claim 1 in which said block copolymer is an addition product of propylene oxide and a polyethylene glycol.

5. A composition as claimed in claim 1 in which said block copolymer is obtained by multiple alternating addtion of ethylene oxide and propylene oxide to at least one glycol selected from the class consisting of polypropylene glycol and polyethylene glycol.

6. A composition as claimed in claim 1 in which said mixture of fatty acids comprises a natural fatty acid selected from the class consisting of soya bean acid, peanut oil acid, tallow acids and palm oil acid in admixture with not less than 30% oleic acid, based on the total weight of the acids.

7. A composition as claimed in claim 1 in which said mixture of fatty acids contains capric acid, myristic acid, palmitic acid, stearic acid, arachidic acid, behenic acid or cerotic acid as a saturated fatty acid component.

8. A composition as claimed in claim 1 in proportions of 15 to 30% by weight of component $a$, 10 to 50% by weight of component $b$ as an ester of said fatty acid mixture having a content of 40 to 80% of oleic acid, and 55 to 70% by weight of component $c$.

* * * * *